United States Patent [19]

Murakoshi

[11] 4,317,618
[45] Mar. 2, 1982

[54] VIBRATING SCREEN FOR IMAGE PROJECTION

[75] Inventor: Makoto Murakoshi, Asaka, Japan

[73] Assignee: Fuji Photo Film Co., Ltd., Minami-ashigara, Japan

[21] Appl. No.: 145,732

[22] Filed: May 1, 1980

[30] Foreign Application Priority Data

May 2, 1979 [JP] Japan .................................. 54-54411

[51] Int. Cl.³ ............................................. G03B 21/56
[52] U.S. Cl. ................................................. 350/120
[58] Field of Search ............... 350/120, 99, 6, 160, 350/268, 276 R; 355/71

[56] References Cited

U.S. PATENT DOCUMENTS

| | | | |
|---|---|---|---|
| 1,969,909 | 8/1934 | Simjian | 350/120 |
| 2,343,586 | 3/1944 | Schufftan | 355/71 X |
| 2,348,818 | 5/1944 | Jacobson | 350/120 |
| 2,525,596 | 10/1950 | Finn | 350/120 |
| 2,780,136 | 2/1957 | Erban | 350/120 |
| 2,837,008 | 6/1958 | Erban | 350/120 |
| 3,125,927 | 3/1964 | Erban | 350/120 |
| 3,186,299 | 6/1965 | Parenti | 350/120 |
| 3,473,862 | 10/1969 | Hauber et al. | 350/120 |
| 3,640,602 | 2/1972 | Wolfe | 350/120 |

FOREIGN PATENT DOCUMENTS 592815  9/1947  United Kingdom ................ 350/120

*Primary Examiner*—Richard A. Wintercorn

[57] ABSTRACT

A vibrating screen for image projection is rotated or subjected to a circular motion or vibration to enhance resolution of the image projected and focused thereon. A circular screen plate or disc is slidably engaged within a rotatable disc eccentrically. The rotatable disc is rotated with the circular screen plate restrained about its position allowed to slightly move within the rotatable disc. Thus, the screen plate or disc is moved or vibrated circularly. The center of gravity of the composite system of the rotatable disc and the screen plate is at the center of rotation of the rotatable disc.

4 Claims, 2 Drawing Figures

VIBRATING SCREEN FOR IMAGE PROJECTION

BACKGROUND OF THE INVENTION

1. Field of the Invention

This invention relates to a vibrating type screen for image projection, and more particularly to a projection screen of vibration type which is periodically vibrated in a plane including the projection surface thereof. The vibrating type screen referred to in this specification broadly reads on a focusing plate ( including a Fresnel lens type focusing plate ) employed in optical instruments and is not limited to an ordinary image projection screen for a projector.

2. Description of the Prior Art

In the projection screen for viewing an image projected thereon by a motion picture projector or a slide projector, the transmission type screen used in a microfilm reader or an enalarging projector, or other projection screen as a focusing plate used in a viewfinder or monitoring device of other optical instruments, the resolution of the image projected thereon is deteriorated by the granularity of the material contained therein for the purpose of diffusing light for enhansing the diffusion of the projection scrren and enlarging the visible angle of view. For instance, in the reflection type screen, a metal screen as of aluminium having high reflectance is processed to have a mat surface or fine glass particles are mixed in a binder to be applied on the surface of the screen to enhance the diffusion effect. In a transmission type screen, a diffusion material like calcium carbonate is mixed in a binder and applied on the screen to enhance the diffusion effect. Further, in the focusing plate, the surface of the glass plate is processed to provide a mat surface to enhance the diffusion effect.

In these projection screens, it is required to reduce the size of the diffusion particles or enhance the grade of the mat surface in order to raise the resolution. This will, on the other hand however, lower the diffusion effect and lower the brightness of the image in the marginal portion of the screen. When the diffusion effect is lowered, not only the marginal portion of the screen becomes dark, but also the brightness of the image on the screen viewed at an angle with respect to the normal direction markedly falls and the angle of view in which the screen can be viewed with high brightness is reduced.

Therefore, in the conventional projection screens the resolution has been sacrified for obtaining high diffusion effect.

In order to make the resolution higher with the high diffusion effect, it has been proposed to finely vibrate the screen in the plane including the surface thereof thereby averaging the granularity of the screen effecting enhancement of the resolution. This type of vibrating screens have, however, disadvantages as follows. For instance, in U.S. Pat. Nos. 3,640,602, 3,125,927 and 3,186,299, there is disclosed a vibrating screen which is vibrated as a whole in the plane including the surface of the screen. This type of screen is disadvantageous in that the whole device is vibrated due to the vibration of the screen or a driving mechanism for vibrating the screen, and the vibration of the device transmits outwardly and brings nuisance to the environment and emits noise, which is undesirable in practical use.

Further, in a rotating type screen in which the screen is rotated about an axis of revolution emitting no vibrating noise, there is a defect in that circular lines become conspicuous. These lines are concentric about the axis of revolution of the screen and are particularly conspicuous near around the axis of revolution where the angular velocity is low. Since the center of the screen is usually important from the viewpoint of observation of the image, this type of screen is improper for practical use.

SUMMARY OF THE INVENTION

The object of the present invention is to provide a projection screen in which the resolution is improved without lowering the brightness and diffusion effect.

A more specific object of the present invention is to provide a vibrating type projection screen in which the resolution is improved without lowering the diffusion effect.

The vibrating type projection screen in accordance with the present invention is characterized in that a screen plate is subjected to a circular motion. In more detail, a screen is restrained from rotation and only allowed to move in a circular motion in a rotatable disc. The rotatable disc is provided with a circular recess and a circular screen plate is rotatably inserted in the recess. The recess is eccentric with respect to the axis of rotation of the rotatable disc and accordingly the circular screen plate is moved in a circular motion by rotating the rotatable disc about its axis of rotation. The center of gravity of the composite system of the rotatable disc and the circular screen plate is at the axis of rotation of the rotatable disc so as not to emit vibrating noise or vibration itself outside. The recess referred to in this specification broadly reads on a through hole. Further, the circular screen plate referred to herein means that the member rotatably inserted or engaged in said recesss of the rotatable disc is circular and a projection screen is provided on the member and not limited to a screen having a circular shape itself. The screen itself provided on the member may not be circular.

The projection screen in accordance with this invention is characterized in that a circular screen is rotatably or slidably inserted or mounted in a circular recess eccentrically provided in a rotatable disc and the disc is rotated to move the screen disc in a circular motion. Thus, the composite system of the rotatable disc and the screen disc can be made to move in a circular motion or rotation as a whole without emitting vibration or noise. The vibrating type referred to herein means the movement of circular motion different from the rotation or revolution about an axis of rotation. The vibrating type screen of this invention includes vibration of the screen itself accompanied by movement of the center of gravity thereof. In other words, the vibration or circular motion referred to here is discriminated from rotation in that the former is accompanied by movement of the center of gravity whereas the latter is not.

The vibrating type screen in accordance with the present invention is characterized in that the whole system including the screen and the rotatable disc is not accompanied by movement of the center of gravity even though the screen itself is vibrated. Thus, no vibration or noise is emitted therefrom and further a high resolution can be attained with high diffusion effect and brightness.

It should be understood that the screen disc used in this invention has not to be perfectly prevented from rotating since a slight rotation accompanying a circular motion thereof will only result a Lissajous's figure motion which is to be covered by the scope of this invention. In case that the screen is completely rotated, however, there will be observed the concentric lines like the conventional rotating type screen, which is to be excluded from the scope of this invention.

DESCRIPTION OF THE PREFERRED EMBODIMENTS

Now the invention will be described in detail with reference to the accompanying drawing.

Figure 1:
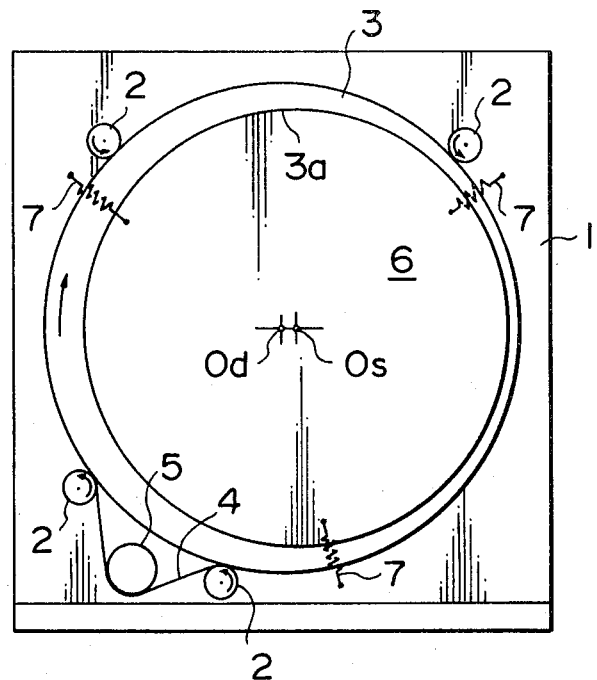
FIG. 1 is a front view of the vibrating type screen for image projection in accordance with an embodiment of the present invention.

FIG. 1 shows an embodiment of the invention. Referring to FIG. 1, a plurality of rollers or pulleys 2 are rotatably mounted on a fixed support plate 1. The rollers or pulleys 2 are located along a circle. A rotatable disc 3 having an eccentric recess 3a is rotatably mounted on the fixed support plate 1 and in contact with all the rollers or pulleys 2 to be rotated thereby. Around the rotatable disc 3 is wound up an endless belt 4 which is rotated to run by a motor 5 thereby rotating the rotatable disc 3 about an axis of rotation Od thereof. Within the eccentric recess 3a is rotatably or slidably mounted a circular screen plate or screen disc 6. The screen disc 6 is prevented from moving axially to be disengaged from the recess by a proper holding means and is made to rotate within the recess 3a about the center Os of the screen disc 6. Further, the screen disc 6 is prevented from rotating with respect to the fixed support plate 1 by means of three tension springs 7 one end of which is fixed or engaged with the screen disc 6 at the marginal portion thereof and the other of which is fixed to the fixed support plate 1. When the rotatable disc 3 is rotated, the screen disc 6 is rotated relative to the rotatable disc 3 but is moved in a circular motion with respect to the fixed support plate 1 about the axis of rotation Od of the rotatable disc 3. The radius of the circular motion is the distance between the two centers Od and Os.

In the above described embodiment, the endless belt 4 rotates the rotatable disc 3 about its axis of rotation Od by rotation of the motor 5 and the screen disc 6 is moved in a circular motion about the same point Od. Since the springs 7 are expandable and are comparatively free in their direction of expansion, they allow the screen disc 6 to slightly rotate relative to the fixed support plate 1 when the rotatable disc 3 is rotated and the screen disc 6 tends to be rotated thereby by friction therewith. When there is a gap between the wall of the recess 3a and the periphery of the screen disc 6, there occurs an additional vibration of the screen disc 6 which cannot be offset by the rotation of the rotatable disc and accordingly the whole system produces a vibration transmitted outwardly. Therefore, it is desired that the screen disc 6 be slidably or rotatably mounted in the recess 3a of the rotatable disc 3.

The distance between the two centers Od and Os that is the degree of ccentricity or the radium of the cicular motion of the screen disc 6 should be large enough to prevent the granularity of the screen 6 from appearing. Therefore, the distance between the two centers should be not less than 0.5 mm. In practice, it is desired to make this distance larger, about 1 mm for instance, in order to make sure the actual circular motion of the screen disc 6. If the distance should be made so large, a number of small circular lines would appear on the screen surface.

The speed of revolution of the screen should also be made practucally high in order to effectively enhance the resolution of the image. In order to effect this, the frequency of the circular motion of the screen disc 6 accordingly of the rotation of the rotatable disc 3 should preferably be not less than 10 Hz.

As will be noted from the above description, the circular motion of the screen disc 6 may not be the absolutely accurate circular motion and may be accompanied by a slight rotation or Lissajou's figured motion for practical use.

In the above embodiment, an endless belt 4 is used for rotating the rotatable risc 3 and tension springs 7 are used for restraining the screen disc 6. These elements can be replace by other elements.

Figure 2:
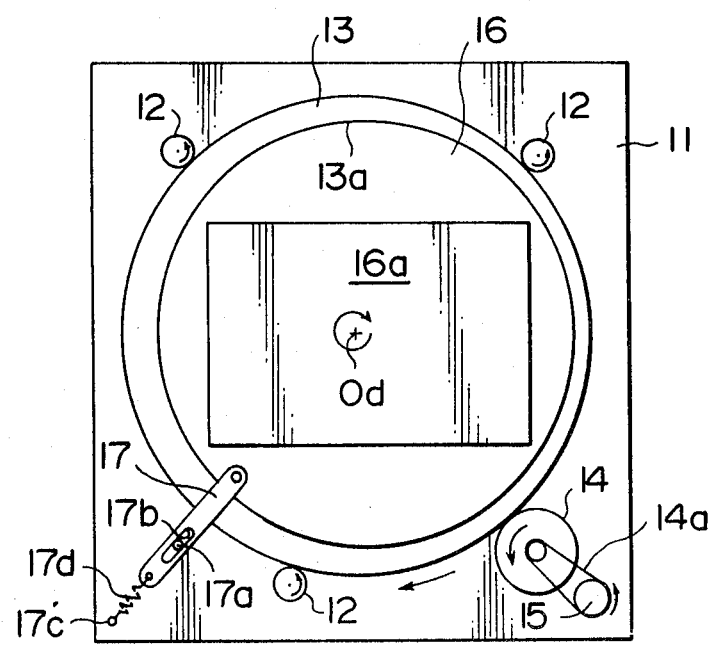
FIG. 2 is a front view of the vibrating type screen for image projection in accordance with another embodiment of the present invention.

FIG. 2 shows another embodiment of the present invention in which these elements are replaced with other elements. As the screen is used a rectangular screen 16a mounted on a screen carrying disc 16. The screen carrying disc 16 corresponds to the screen disc 6 in the first embodiment. Three guide rollers 12 are rotatably mounted on a fixed support plate 11 and a rotatable disc 13 is rotatably mounted on the plate 11 in contact with these guide rollers 12. The periphery of the rotatable disc 13 is in pressure contact with a rubber drive roller 14 which is driven by a motor 15 and a driving belt 14a. At the center of the screen carrying disc 16 is mounted a rectangular screen 16a. An end of a lever 17 is pivotally mounted on the screen carrying disc 16 at a position close to the periphery thereof. The other end of the lever 17 is engaged with a tension spring 17d which is fixed to the fixed support plate 11 at an end thereof 17c. The lever 17 is further provided with a slot 17b with which a pin 17a fixed to the support plate 11 is slidably engaged. The lever 17 is tensioned in the radial direction by the spring 17d.

In the second embodiment, the rotatable disc 13 is rotated by means of the rubber drive roller 14 by the motor 15 and the screen carrying disc 16 is caused to move in a circular motion being restrained from rotation by the tension lever 17. Therefore, the rectangular screen 16a moves in a circular motion. In this case also, the screen 16a is not moved in a perfect circular motion but in an approximately circular motion in which rotation is sometimes added to the circular motion.

In both of the above described embodiments, the composite system consisting of the rotatable disc 3,13 having a recess 3a, 13a and the screen disc 6 or the screen carrying disc 16 and the rectangular screen 16a must have a uniform mass distribution and have the center of gravity at a fixed point, at the axis of rotation of the rotatable disc 3,13. In order to realize this requirement, it is possible to make the rotatable disc 3,13 and the screen disc 6,16 by the same material of the same thickness. It is also possible to make the center of gravities of the two elements located on the opposite sides of the axis of rotation Od of the rotatable disc 3,13 and make the average of the center of gravities located just on the axis of rotation Od. By making such an arrangement, it is possible to make a screen device which does not produce a vibration transmitted outward.

It should be noted that if a Fresnel lens is replaced for the screen, it is possible to make the stripes of the Fresnel lens disappear. For instance, in an over-head projector, by making the Fresnel lens used for illuminating the original on the light table thereof move in a circular motion, the glare due to the stripes of the Fresnel lens can be reduced or controlled.

Further, in an optical system in which an image is first focused on a first focal plane by a first lens and then is focused again on a second and final display plane by a second lens, a field lens in the form of a Fresnel lens is often used on the first focal plane to prevent the loss of the light. In such a case, the stripes of the Fresnel lens are focused on the final focal plane and accordingly becomes noise for the focused image. Then, by making the Fresnel lens move in a circular motion in accordance with the present invention the stripes of the Fresnel lens can be removed without deteriorating the image quality of the image focused on the final focal plane.

Furthermore, in case that a Fresnel lens is used as a projection screen as in case of an instant movie like "Polavision" made of Polaloid Corp., there appears a moire pattern on the screen due to the filter stripes existing in the image projected on the screen. This problem can be easily solved by vibrating the Fresnels lens in accordance with the present invention.

I claim:

1. A vibrating screen for image projection comprising a fixed support plate, a rotatable disc provided on the fixed support plate to rotate about an axis of rotation fixed with respect to the support plate, said rotatable disc having an eccentric circular recess, a circular screen plate rotatably inserted in said circular recess, a restraining means for preventing said circular screen plate from rotating relative to said support plate with a tolerance to allow the circular screen plate to move in a circular motion in said rotatable disc, and means for rotating said rotatable disc, the center of gravity of the composite system consisting of the rotatable disc and the screen plate being at the axis of rotation of the rotatable disc.

2. A vibrating screen for image projection as defined in claim 1 wherein said restraining means comprises tension springs an end of which is fixed to the screen plate and the other end of which is fixed to said support plate.

3. A vibrating screen for image projection as defined in claim 1 wherein said restraining means comprises a lever having a slot an end of which is pivotally mounted on said screen plate near the periphery thereof and the other end of which is engaged with a tension spring that is fixed at its end to said support plate, and a pin fixed to said support plate and slidably engaged with said slot.

4. A vibrating screen for image projection as defined in claim 1 wherein said recess is a through hole and said screen plate is a transmission type projection screen.

* * * * *